(12) United States Patent
Yano et al.

(10) Patent No.: US 7,959,717 B2
(45) Date of Patent: Jun. 14, 2011

(54) AIR CONDITIONING SYSTEM WITH ELECTROSTATICALLY ATOMIZING FUNCTION

(75) Inventors: Takeshi Yano, Kyoto (JP); Toshihisa Hirai, Hikone (JP); Kishiko Hirai, legal representative, Hikone (JP); Sumio Wada, Hikone (JP); Akihide Sugawa, Hikone (JP); Tatsuhiko Matsumoto, Habikino (JP); Shousuke Akisada, Hikone (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 418 days.

(21) Appl. No.: 12/095,311

(22) PCT Filed: Dec. 11, 2006

(86) PCT No.: PCT/JP2006/324700
§ 371 (c)(1),
(2), (4) Date: May 28, 2008

(87) PCT Pub. No.: WO2007/069577
PCT Pub. Date: Jun. 21, 2007

(65) Prior Publication Data
US 2010/0133366 A1 Jun. 3, 2010

(30) Foreign Application Priority Data

Dec. 16, 2005 (JP) .................................. 2005-363913
Dec. 16, 2005 (JP) .................................. 2005-363914

(51) Int. Cl.
*B03C 3/16* (2006.01)
(52) U.S. Cl. ............. 96/27; 95/71; 95/73; 96/52; 96/62; 96/74; 96/97; 239/697

(58) Field of Classification Search ................ 96/27, 52, 96/53, 62, 74, 97; 239/3, 102.1, 102.2, 697, 239/698; 261/78.2, 81; 95/71, 73
See application file for complete search history.

(56) References Cited

U.S. PATENT DOCUMENTS

| 2,357,355 A | * | 9/1944 | Penney ............................. 96/27 |
| 3,331,192 A | * | 7/1967 | Peterson ........................... 96/27 |
| 3,503,704 A | * | 3/1970 | Marks ............................. 423/212 |
| 3,807,137 A | * | 4/1974 | Romell ............................. 95/72 |
| 4,095,962 A | * | 6/1978 | Richards .......................... 95/65 |

(Continued)

FOREIGN PATENT DOCUMENTS
CN 1116592 A 2/1996
(Continued)

OTHER PUBLICATIONS

International Search Report for the Application No. PCT/JP2006/324700 mailed Feb. 20, 2007.

(Continued)

*Primary Examiner* — Richard L Chiesa
(74) *Attorney, Agent, or Firm* — Cheng Law Group, PLLC

(57) ABSTRACT

An air conditioning system with an electrostatically atomizing function includes an electrostatically atomizing unit and a ventilation duct which flows conditioned air. The electrostatically atomizing unit generates a mist of charged minute water particles. The electrostatically atomizing unit is provided with a discharge port which locates adjacent to an air outlet of the ventilation duct. The mist of the charged minute water particles flows into an airflow which is sent from the ventilation duct. The mist of the charged minute water particles effectively spreads to the space by the air flow without dissipating inside the ventilation duct.

10 Claims, 3 Drawing Sheets

U.S. PATENT DOCUMENTS

| | | | |
|---|---|---|---|
| 4,979,968 A * | 12/1990 | Jido | 96/27 |
| 5,156,204 A | 10/1992 | Doi | |
| 5,595,587 A * | 1/1997 | Steed | 96/27 |
| 5,645,769 A | 7/1997 | Tamaru et al. | |
| 5,653,919 A * | 8/1997 | White et al. | 261/21 |
| 6,656,253 B2 * | 12/2003 | Willey et al. | 96/27 |
| 7,473,298 B2 * | 1/2009 | Suda et al. | 95/64 |
| 7,494,532 B2 * | 2/2009 | Azukizawa et al. | 96/27 |
| 7,503,512 B2 * | 3/2009 | Nakada et al. | 239/690.1 |
| 2007/0167124 A1 | 7/2007 | Gotoh et al. | |
| 2008/0130189 A1 | 6/2008 | Kobayashi et al. | |
| 2008/0229606 A1 | 9/2008 | Hirai | |
| 2009/0001200 A1 | 1/2009 | Imahori et al. | |

FOREIGN PATENT DOCUMENTS

| | | |
|---|---|---|
| EP | 1 980 433 A1 | 10/2008 |
| JP | 54-96243 A | 7/1979 |
| JP | 56-25012 A | 3/1981 |
| JP | 58-73415 A | 5/1983 |
| JP | 62-155122 A | 7/1987 |
| JP | 63-110112 U | 7/1988 |
| JP | 64-052522 A | 2/1989 |
| JP | 06-115347 A | 4/1994 |
| JP | 2005-96499 A | 4/2005 |
| JP | 2005-131549 A | 5/2005 |
| JP | 2005-296753 A | 10/2005 |
| JP | 2005-337611 A | 12/2005 |
| JP | 2007-163109 A | 6/2007 |
| WO | WO-2004-110642 A1 | 12/2004 |
| WO | WO-2005-102101 A1 | 11/2005 |

OTHER PUBLICATIONS

Notification of Reasons for Refusal for the Application No. 2005-363913 from Japan Patent Office mailed May 12, 2009.

Notification of the First Office Action for the Application No. 200680046749.3 from State Intellectual Property Office of People's Republic of China dated Jul. 31, 2009.

Supplementary European Search Report for the Application No. EP 06 83 4455 dated Sep. 21, 2009.

Notification of Reasons for Refusal for the Application No. 2005-363914 from Japan Patent Office mailed Jul. 27, 2010.

* cited by examiner

AIR CONDITIONING SYSTEM WITH ELECTROSTATICALLY ATOMIZING FUNCTION

TECHNICAL FIELD

The present invention relates to an air conditioning system with an electrostatically atomizing function generating a mist of charged minute water particles.

BACKGROUND ART

Japanese patent application no. 2005-131549A discloses an electrostatically atomizing unit which generates the mist of the charged minute water particles by electrostatically atomizing water. The electrostatically atomizing unit atomizes the water which is supplied to an emitter electrode by Rayleigh breakup so as to generate the mist of the charged minute water particles of nanometer size. The mist of the charged minute water particles includes radicals, is able to float in air over an extended time period, and is able to spread in the air in large quantity. The mist of the charged minute water particles adheres to malodorous component which adheres to surface of walls, clothes, and curtains of the space where the mist is discharged, and subsequently deodorizes the malodorous component effectively.

Thus, the mist of the charged minute water particles is expected to spread in the space extensively by the air which is sent by the air conditioning system. But in the case to incorporate the electrostatically atomizing unit into the air conditioning system, a following problem occurs. Namely, in the case of arranging the electrostatically atomizing unit at the inside of a ventilation duct, the electrostatically atomizing unit is exposed to a high temperature air or a low humidify air which are conditioned by a heat exchanger of the air conditioning system. The conditioned air evaporates the water which is supplied to the emitter electrode. The conditioned air causes the emitter electrode not to electrostatically atomize the water. And in the case of incorporating the electrostatically atomizing unit into the air conditioning system, user needs to supply the water for electrostatically atomizing. So the electrostatically atomizing unit includes a cooling means for cooling the emitter electrode. The cooling means cools the emitter electrode. The moisture in air condenses the water to the emitter electrode. In this way, the emitter electrode electrostatically atomizes the condensed water and generates the mist of the charged minute water particles. The electrostatically atomizing unit does not need to supply the water and has great usability. But, the above electrostatically atomizing unit is not able to condense the water from the conditioned air. As a result, the above electrostatically atomizing unit is not able to generate the mist of the charged minute water particles.

In addition, for example, the air conditioning system for automobile use includes an air-conditioning equipment such as a heat exchanger, an air outlet to send the air to an interior space of an automobile, and a long ventilation duct being provided between the air-conditioning equipment and the air outlet. In the case of arranging the electrostatically atomizing device inside the ventilation duct, the ventilation duct causes the dissipation of the mist of the charged minute water particles before reaching to the air outlet. In this way, the ventilation duct causes the problem to extremely lessen an amount of the mist of the charged minute water particles for discharging to the interior space of the automobile.

DISCLOSURE OF THE INVENTION

In view of the above problem, the present invention has been achieved to provide an air conditioning system with the electrostatically atomizing function for effectively spreading the mist which is generated by the electrostatically atomizing to the space.

The air conditioning system in accordance with the present invention comprises an electrostatically atomizing unit and a ventilation duct configured to flow a conditioned air and to have an air outlet for sending the conditioned air. The electrostatically atomizing unit comprises an emitter electrode, a water supplying means for supplying water to the emitter electrode, an opposed electrode disposed in an opposed relation to the emitter electrode, and a high voltage source. The high voltage source is configured to apply a high voltage across the emitter electrode and the opposed electrode, thereby electrostatically atomizing the water at a tip of the emitter electrode to generate a mist of charged minute water particles flowing from the emitter electrode towards and through the opposed electrode. The electrostatically atomizing unit comprises a discharge port for discharging the mist of the charged minute water particle. The electrostatically atomizing unit is disposed outwardly of the ventilation duct to locate the discharge port adjacent to the air outlet in order to carry the mist on the conditioned air flowing from the air outlet. In this case, the air conditioning system is able to spread the mist of the charged minute water particles extensively and effectively to the interior space without causing the dissipation of the mist of the charged minute water particles at the ventilation duct.

Preferably, the electrostatically atomizing unit includes an atomization barrel which is configured to surround the emitter electrode and hold the opposed electrode. The atomization barrel is formed at its front end with the discharge port. The atomization barrel has a center axis which is inclined with respect to a direction of the conditioned air flowing from the air outlet. In this case, the mist of the charged minute water particles is effectively carried on conditioned airflow.

Preferably, the electrostatically atomizing unit includes an atomization barrel which is configured to surround the emitter electrode and hold the opposed electrode, and includes an extension duct flowing the mist of the charged minute water particles discharged from the atomization barrel. The extension duct is formed at its front end with the discharge port and is arranged to locate the discharge port downstream of the air outlet. In this case of using the extension duct, the electrostatically atomizing unit is able to be located away from the air outlet.

Preferably, the extension duct is a bendable flexible duct. In this case, the bendable flexible duct increases a degree of a freedom of an arranging position of the electrostatically atomizing unit.

Preferably, the extension duct is tapered to have its inside diameter smaller towards the discharge port than at the connection with the atomization barrel. The electrostatically atomizing unit generates noise by applying the high voltage for generating the mist of the charged minute water particles. In this case, the extension duct is able to reduce the noise leakage to the outside. Consequently, the extension duct is able to provide the noise reduction effect.

In addition, the electrostatically atomizing unit includes an atomization barrel which is configured to surround the emitter electrode and hold the opposed electrode, and includes the extension duct flowing the mist of the charged minute water particles discharged from the atomization barrel. Preferably, the extension duct is formed at its front end with the discharge port which is connected to the ventilation duct immediately upstream of the air outlet.

In addition, it is preferable that the ventilation duct is configured to have a branch duct which merges to a portion of the extension duct to flow a portion of the conditioned air into the extension duct. In this case, the conditioned air creates airflow inside the extension duct. The airflow effectively carries the mist of the charged minute water particles to the air which is discharged from the air outlet effectively.

REST MODE FOR CARRYING OUT THE INVENTION

Figure 1:
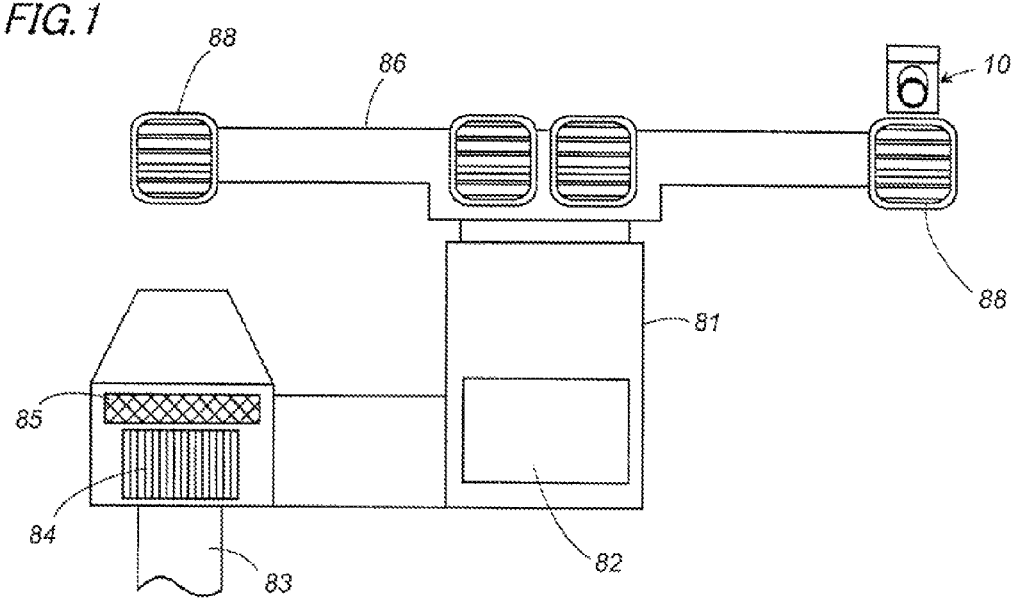
FIG. 1 is a schematic view of an air conditioning system with the electrostatically atomizing function in accordance with an embodiment of the present invention.

Now, a reference is made to the attached drawings to explain an air conditioning system in accordance with an embodiment of a present invention. FIG. 1 shows an example of the present invention which is incorporated to the air conditioning system for automobile use. The air conditioning system includes a heat exchanging chamber 81, an air incoming duct 83, and a ventilation duct 86. The heat exchanging chamber 81 includes a heat exchanger 82. The air incoming duct 83 is provided in order to take the air of the inside and outside of the automobile to the heat exchanger 81. The ventilation duct 86 is provided in order to send the air which is heat-exchanged at the heat exchanging chamber 81 to the inside of an automobile. The air incoming duct 83 is provided with a fan 84 for taking the air, and an air filter 85. The fan 84 creates a forced airflow. The forced airflow sends conditioned air to the inside of the automobile from air outlets 88 which are disposed at the front end of the ventilation duct 86 and at the midstream of the ventilation duct 86.

Figure 2:
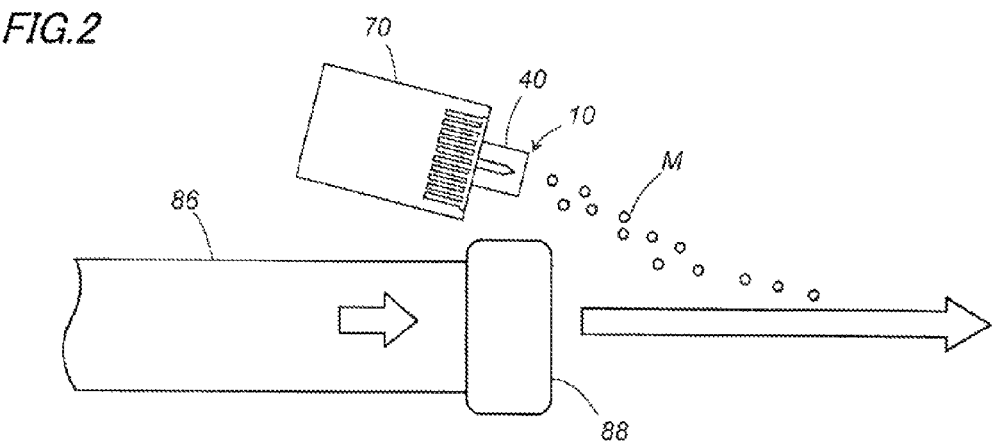
FIG. 2 is a schematic view in a portion of the above air conditioning system.

An electrostatically atomizing unit 10 is located adjacent to one of the air outlets 88. In addition, the electrostatically atomizing unit is able to be located at each air outlet 88. As shown in FIG. 2, the air outlets 88 send the air flow. The air flow carries the mist of the charged minute water particles which is generated by the electrostatically atomizing unit 10, and spreads the mist of the charged minute water particles to an interior space of the automobile.

Figure 3:
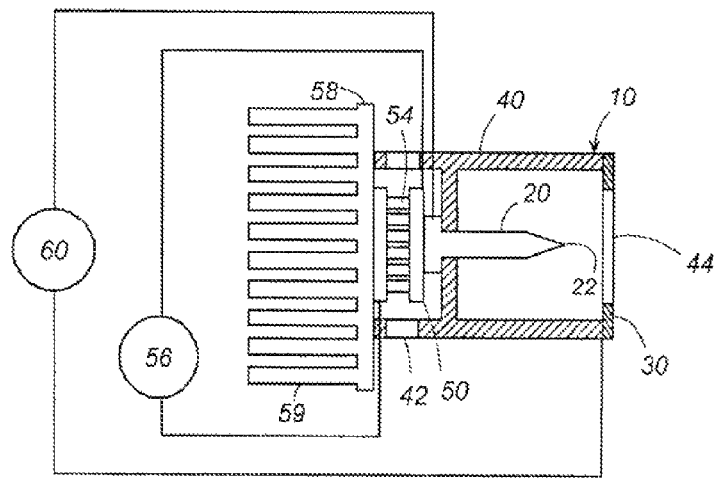
FIG. 3 is a cross sectional view of the electrostatically atomizing unit which is used in the above air conditioning system.

As shown in FIG. 3, the electrostatically atomizing unit 10 includes an atomization barrel 40 which holds an emitter electrode 20, an opposed electrode 30, and a cooling device 50. The emitter electrode 20 is arranged along a central axis of the atomization barrel 40, is configured to have its rear end fixed to an upper side of the cooling device 50, and is configured to have its front end which is projected into the atomization barrel 40. The opposed electrode 30 is formed into the ring shape and has a circular window in the center. The opposed electrode 30 is configured to be fixed at the front end of the atomization barrel 40 and is configured to have its center of the circular window aligned with the center axis of the atomization barrel 40. The opposed electrode 30 is spaced from the discharge end 22 of the front end of the emitter electrode 20 along the axial direction of the atomization barrel 40. Both the emitter electrode 20 and the opposed electrode 30 are connected to an external high voltage source 60. The high voltage source 60 includes a transformer and is designed to apply a predetermined voltage between the emitter electrode 20 and the grounded opposed electrode 30. The high voltage source 60 applies the high voltage (for instance, −4.6 kV) to the emitter electrode 20 and generates the high voltage electric field between the discharge end of the emitter electrode 20 and the inner circumferential edge of the circular window of the grounded opposed electrode 30. And as mentioned later, the high voltage source 60 charges the water which is supplied onto the emitter electrode 20. The discharge end 22 of the emitter electrode 20 discharges the mist of the charged minute water particles.

The high voltage source 60 applies the high voltage between the emitter electrode 20 and the opposed electrode so as to generate the Coulomb force between the opposed electrode 30 and the water held at the front end of the emitter electrode 20. And then, a portion of a surface of the water protrudes from the surface of the water. In this way, the Taylor cone is formed on the surface of the water. Electric charges are concentrated to the tip of the Taylor cone. The electric field intensity of the tip of the Taylor cone becomes large due to the electric charges. In this way, the Coulomb force generated at the tip of the Taylor cone becomes larger, thereby enlarging the Taylor cone. When the Coulomb force becomes larger than a surface tension of the water, a large amount of the mist of the charged minute water particles of nanometer size is generated by repeating the disintegration of the Taylor cone (Rayleigh breakup). The mist of the charged minute water particles is discharged out of the atomization barrel 40 through the opposed electrode 30 together with an airflow being caused by an ion wind which flows from the emitter electrode 20 toward the opposed electrode 30. A peripheral wall of a rear end of the atomizing barrel 40 is provided with a plurality of air inlets. The airflow is kept by the air which flows from a plurality of the air inlets.

The atomization barrel 40 has its bottom to which the cooling device 50 is fixed. The cooling device 50 comprises a Peltier-effect thermoelectric-module. The cooling device has its cooling side which is coupled to the emitter electrode 20. The cooling side of the cooling device 50 cools the emitter electrode 20 to a temperature of dew point or below, thereby condensing the water to the emitter electrode from moisture of circumambient air. The cooling device 50 defines a water supplying means in order to supply the water to the emitter electrode 20. The cooling device 50 includes a pair of conductive circuit boards and a plurality of thermoelectric elements which are connected in series between the conductive circuit boards. The cooling device 50 cools the emitter electrode 20 at a cooling rate which is determined by the applied variable voltage from an external cooling power source 56. The conductive circuit board of the cooling side is thermally coupled to the rear end of the emitter electrode 20. Meanwhile, the conductive circuit board of a heat radiation side is thermally coupled to a heat radiating board 58. The heat radiating board 58 is fixed to the rear end of the atomization barrel and is provided with a heat radiating fin 59 for promoting a heat radiation. The cooling power source 56 controls the cooling device 50 to maintain the temperature of the emitter electrode 20 at a suitable temperature according to the ambient temperature and the ambient moisture. Namely, the cooling power source 56 is configured to control the cooling device 50 to maintain the temperature of the emitter electrode 20 at the suitable temperature for condensing a sufficient amount of the water onto the emitter electrode 20.

The electrostatically atomizing unit 10 which includes the above components is held to a casing 70 which incorporates the high voltage power source 60 and the cooling power source 56. As shown in FIG. 2, the electrostatically atomizing unit 10 is located adjacent to the air outlet 88 of the ventilation duct 86. The mist of the charged minute water particles M is discharged through a discharge port 44 of the front end of the atomization barrel 40, and is carried by the conditioned airflow which flows from the air outlet 88. The electrostatically atomizing unit 10 is arranged to have its atomization barrel which has the central axis which is inclined to the airflow which flows from the air outlet 88. Namely, the electrostatically atomizing unit 10 is arranged to have its atomization barrel which has the central axis which is inclined to the central axis of an opening of the air outlet 88. As a result, the mist of the charged minute water particles M is able to be efficiently carried by the airflow and is able to spread into the interior space effectively.

Figure 4:
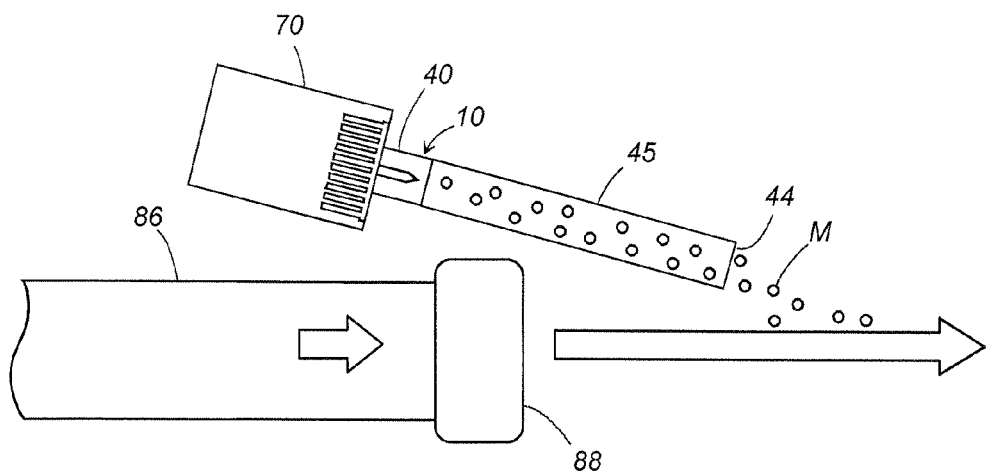
FIG. 4 is a schematic view in a portion of a first modification of the above air conditioning system.

FIG. 4 shows a first modification of the electrostatically atomizing unit 10. The electrostatically atomizing unit 10 is attached with the extension duct 45. In this modification, the extension duct 45 is attached to the tip of the atomization barrel 40. The mist of the charged minute water particles M flows through the extension passageway of the extension duct 45, is discharged from the discharge port 44 of the front end of the extension duct 45, and then is carried by the airflow. The extension duct 45 is connected coaxially to the atomization barrel 40 and is arranged to have its center axis which is inclined to an center of an opening of the air outlet 88. By providing the extension duct 45 to the electrostatically atomizing unit 10, the electrostatically atomizing unit 10 is able to arrange sufficiently rearward of the air outlet 88. As substitute for the above extension duct 45, it is also preferable to use a bendable flexible duct as the extension duct 45. In this case, the bendable flexible duct increases a degree of a freedom of an arranging position of the electrostatically atomizing unit 10, and is able to flow the mist of the charged minute water particles M on the conditioned air flow.

Figure 5:
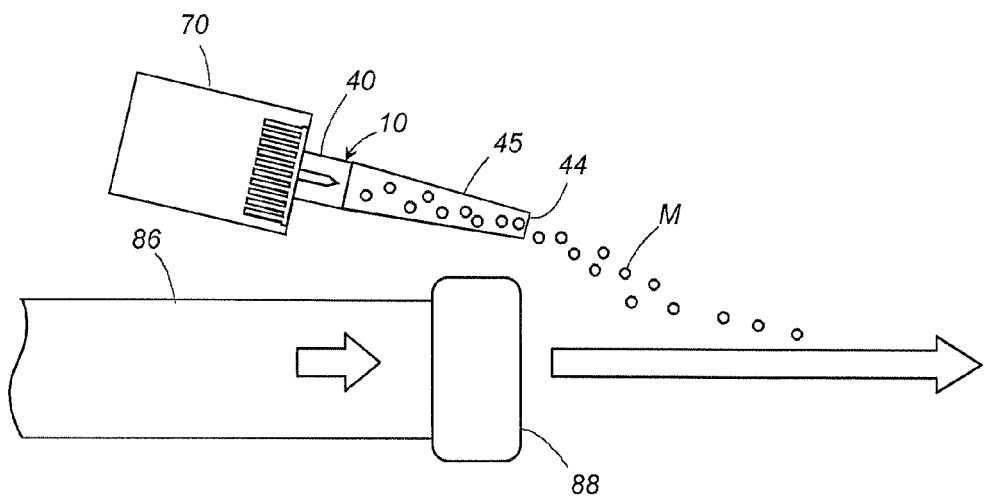
FIG. 5 is a schematic view in a portion of a second modification of the above air conditioning system.

FIG. 5 shows a second modification of the electrostatically atomizing unit 10. In this modification, the extension duct 45 is tapered to have its diameter smaller toward the discharge port 44 than at the connection with the atomization barrel. The above mentioned electrostatically atomizing unit 10 generates noise due to the applied high voltage for generating the mist of the charged minute water particles. However, the extension duct 45 of the tapered shape prevents the noise from leaking to the outside. Consequently, the noise reduction effect is provided.

Figure 6:
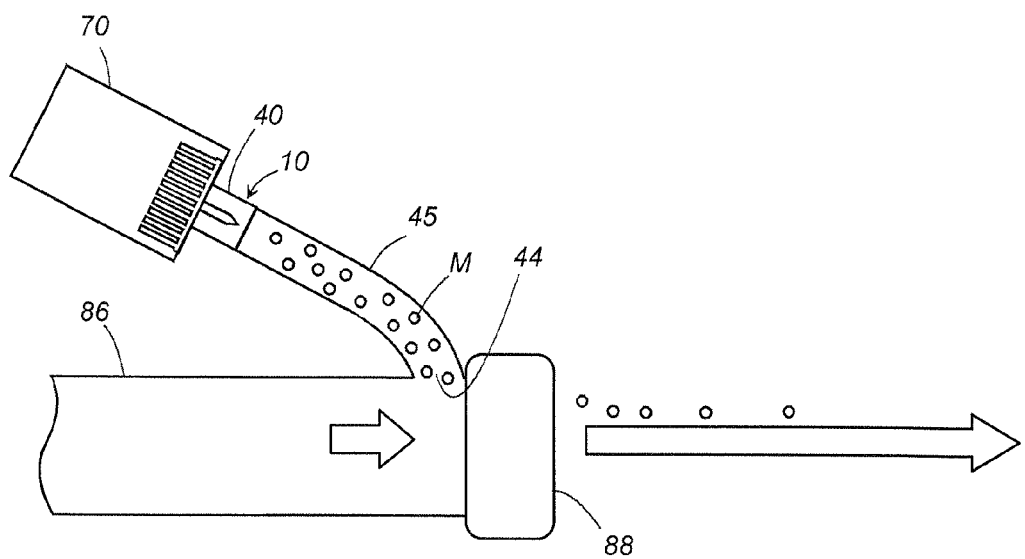
FIG. 6 is a schematic view in a portion of a third modification of the above air conditioning system.

FIG. 6 shows the third modification of the electrostatically atomizing unit 10. In this modification, the extension duct 45 is formed at its front end with the discharge port 44 which is connected to the ventilation duct 80 immediately upstream of the air outlet 88. In this case, the extension duct 45 is able to carry the mist of the charged minute water particles on the conditioned airflow adjacent to the air outlet 88. Consequently, the mist of the charged minute water particles M is able to effectively spread to the interior space by the airflow.

Figure 7:
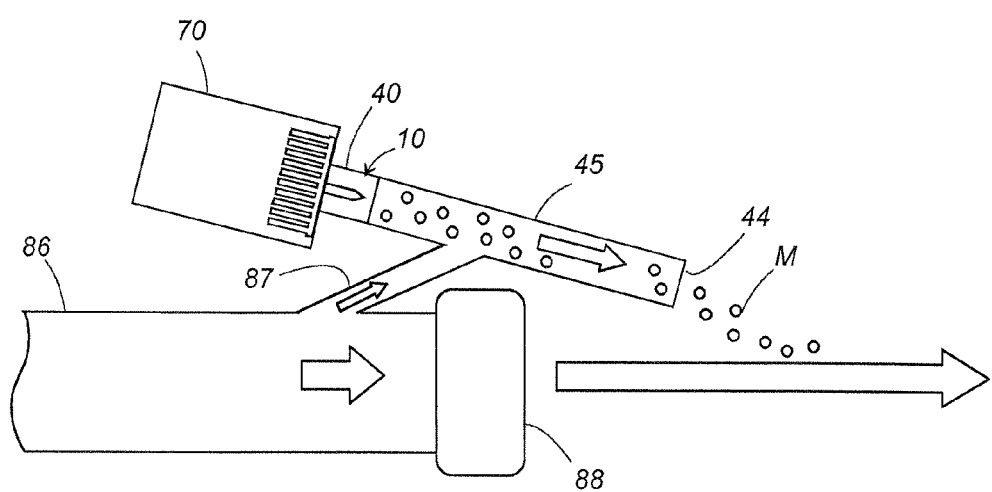
FIG. 7 is a schematic view in a portion of a fourth modification of the above air conditioning system.

FIG. 7 shows a fourth modification of the electrostatically atomizing unit 10. The branch duct 87 is connected to a portion of the extension duct 45 and is configured to flow a portion of the conditioned air to the extension duct 45. Therefore a current of the mist of the charged minute water particles which flows through the extension duct 45 is accelerated by the conditioned air which flows through the extension duct 45. The mist of the charged minute water particles M flows into the airflow which flows from the air outlet 88. Consequently, the mist of the charged minute water particles M is able to efficiently spread to the interior space by the airflow.

The invention claimed is:

1. An air conditioning system with an electrostatically atomizing function, said system comprising:
   an electrostatically atomizing unit; and
   a ventilation duct configured to flow a conditioned air and to have an air outlet for sending said conditioned air;
   said atomizing unit comprising:
   an emitter electrode;
   a water supplying means for supplying water to said emitter electrode;
   an opposed electrode disposed in an opposed relation to said emitter electrode;
   a high voltage source configured to apply a high voltage across said emitter electrode and said opposed electrode, thereby electrostatically atomizing the water at a tip of said emitter electrode to generate a mist of charged minute water particles flowing from said emitter electrode towards and through said opposed electrode; and
   a discharge port for discharging said mist of the charged minute water particle;
   said electrostatically atomizing unit being disposed outwardly of said ventilation duct to locate said discharge port adjacent to said air outlet in order to carry said mist on said conditioned air flowing from said air outlet, wherein
   said electrostatically atomizing unit includes an atomization barrel which is configured to surround said emitter electrode and hold said opposed electrode, said atomization barrel being formed at its front end with said discharge port, said atomization barrel having a center axis which is inclined with respect to a direction of said conditioned air flowing from said air outlet.

2. An air conditioning system with an electrostatically atomizing function, said system comprising:
   an electrostatically atomizing unit; and
   a ventilation duct configured to flow a conditioned air and to have an air outlet for sending said conditioned air;
   said atomizing unit comprising:
   an emitter electrode;
   a water supplying means for supplying water to said emitter electrode;
   an opposed electrode disposed in an opposed relation to said emitter electrode;
   a high voltage source configured to apply a high voltage across said emitter electrode and said opposed electrode, thereby electrostatically atomizing the water at a tip of said emitter electrode to generate a mist of charged minute water particles flowing from said emitter electrode towards and through said opposed electrode; and
   a discharge port for discharging said mist of the charged minute water particle;
   said electrostatically atomizing unit being disposed outwardly of said ventilation duct to locate said discharge port adjacent to said air outlet in order to carry said mist on said conditioned air flowing from said air outlet, wherein
   said electrostatically atomizing unit includes an atomization barrel which is configured to surround said emitter electrode and hold said opposed electrode, and includes an extension duct flowing said mist of the charged minute water particles discharged from said atomization barrel, said extension duct being formed at its front end with said discharge port and being arranged to locate said discharge port in the vicinity of said air outlet.

3. An air conditioning system as set forth in claim 2, wherein
said extension duct is a bendable flexible duct.

4. An air conditioning system as set forth in claim 2, wherein
said extension duct is tapered to have its inside diameter narrower towards said discharge port than at the connection with said atomization barrel.

5. An air conditioning system as set forth in claim 2, wherein
said ventilation duct is configured to have a branch duct which merges to a portion of said extension duct to flow a portion of said conditioned air into said extension duct.

6. An air conditioning system with an electrostatically atomizing function, said system comprising:
an electrostatically atomizing unit; and
a ventilation duct configured to flow a conditioned air and to have an air outlet for sending said conditioned air;
said atomizing unit comprising:
an emitter electrode;
a water supplying means for supplying water to said emitter electrode;
an opposed electrode disposed in an opposed relation to said emitter electrode;
a high voltage source configured to apply a high voltage across said emitter electrode and said opposed electrode, thereby electrostatically atomizing the water at a tip of said emitter electrode to generate a mist of charged minute water particles flowing from said emitter electrode towards and through said opposed electrode; and
a discharge port for discharging said mist of the charged minute water particle;
said electrostatically atomizing unit being disposed outwardly of said ventilation duct to locate said discharge port adjacent to said air outlet in order to carry said mist on said conditioned air flowing from said air outlet, wherein
said electrostatically atomizing unit includes an atomization barrel which is configured to surround said emitter electrode and hold said opposed electrode, and includes a extension duct flowing said mist of the charged minute water particles discharged from said atomization barrel, said extension duct being formed at its front end with said discharge port which is connected to said ventilation duct immediately upstream of said air outlet.

7. An air conditioning system with an electrostatically atomizing function, said system comprising:
an electrostatically atomizing unit; and
a ventilation duct configured to flow a conditioned air and to have an air outlet for sending said conditioned air;
said atomizing unit comprising:
an emitter electrode;
a water supplying means for supplying water to said emitter electrode;
an opposed electrode disposed in an opposed relation to said emitter electrode;
a high voltage source configured to apply a high voltage across said emitter electrode and said opposed electrode, thereby electrostatically atomizing the water at a tip of said emitter electrode to generate a mist of charged minute water particles flowing from said emitter electrode towards and through said opposed electrode; and
a discharge port for discharging said mist of the charged minute water particle;
said electrostatically atomizing unit being disposed outwardly of said ventilation duct to locate said discharge port adjacent to said air outlet in order to carry said mist on said conditioned air flowing from said air outlet, wherein
said electrostatically atomizing unit includes an atomization barrel which is configured to surround said emitter electrode and hold said opposed electrode, and includes an extension duct flowing said mist of the charged minute water particles discharged from said atomization barrel, said extension duct being formed at its front end with said discharge port and being arranged to locate said discharge port downstream of said air outlet.

8. An air conditioning system as set forth in claim 7, wherein
said extension duct is a bendable flexible duct.

9. An air conditioning system as set forth in claim 7, wherein
said extension duct is tapered to have its inside diameter narrower towards said discharge port than at the connection with said atomization barrel.

10. An air conditioning system as set forth in claim 7, wherein
said ventilation duct is configured to have a branch duct which merges to a portion of said extension duct to flow a portion of said conditioned air into said extension duct.

* * * * *